(12) United States Patent
Buzzard et al.

(10) Patent No.: US 10,518,797 B2
(45) Date of Patent: Dec. 31, 2019

(54) MANUALLY ADJUSTABLE STEERING COLUMN ASSEMBLY

(71) Applicant: STEERING SOLUTIONS IP HOLDING CORPORATION, Saginaw, MI (US)

(72) Inventors: Donald A. Buzzard, Saginaw, MI (US); Michael P. Anspaugh, Bay City, MI (US); Justin D. Mills, Clio, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 148 days.

(21) Appl. No.: 15/634,522

(22) Filed: Jun. 27, 2017

(65) Prior Publication Data
US 2018/0370558 A1 Dec. 27, 2018

(51) Int. Cl.
*B62D 1/183* (2006.01)
*B62D 1/185* (2006.01)
*B62D 1/184* (2006.01)

(52) U.S. Cl.
CPC ............. *B62D 1/183* (2013.01); *B62D 1/184* (2013.01); *B62D 1/185* (2013.01)

(58) Field of Classification Search
CPC ......... B62D 1/183; B62D 1/184; B62D 1/185
See application file for complete search history.

(56) References Cited

U.S. PATENT DOCUMENTS

| | | | | |
|---|---|---|---|---|
| 887,701 A | * | 5/1908 | Schoening | B62D 1/184 114/144 R |
| 918,166 A | * | 4/1909 | Koenigsburg et al. | B62D 1/184 74/493 |
| 1,548,411 A | * | 8/1925 | Derr | B62D 1/185 74/493 |
| 2,074,334 A | * | 3/1937 | Hughes | B62D 1/184 74/493 |
| 2,331,996 A | * | 10/1943 | Maurer | B62D 1/185 403/104 |
| 2,744,419 A | * | 5/1956 | Chayne | B62D 1/184 200/61.54 |
| 2,910,887 A | * | 11/1959 | Helms | B62D 1/184 74/493 |
| 3,170,711 A | * | 2/1965 | Dunifon | B62D 1/183 280/775 |
| 3,302,478 A | * | 2/1967 | Pauwels | B62D 1/183 180/78 |

(Continued)

FOREIGN PATENT DOCUMENTS

DE   102015216326 B4   9/2016

OTHER PUBLICATIONS

English translation regarding DE102015216326B4, ThyssenKrupp AG; 21 pgs.

*Primary Examiner* — Ruth Ilan

(57) ABSTRACT

A steering column assembly includes a first jacket. Also included is a second jacket operatively coupled to the first jacket, the first jacket manually telescopingly moveable relative to the second jacket between an extended position and a retracted position. Further included is a clamp lever moveable between an unlocked position and a locked position, the first jacket manually moveable from the retracted position to the extended position when the clamp lever is in the unlocked position.

9 Claims, 2 Drawing Sheets

(56) References Cited

U.S. PATENT DOCUMENTS

| | | | | |
|---|---|---|---|---|
| 4,273,005 | A * | 6/1981 | Strutt | B62D 1/185 |
| | | | | 74/492 |
| 4,317,387 | A * | 3/1982 | Myers | B62D 1/184 |
| | | | | 403/108 |
| 6,070,686 | A * | 6/2000 | Pollmann | B60R 25/0221 |
| | | | | 180/287 |
| 9,360,865 | B2 * | 6/2016 | Yopp | G05D 1/0061 |
| 2014/0028008 | A1 * | 1/2014 | Stadler | B62D 1/192 |
| | | | | 280/777 |
| 2014/0137693 | A1 * | 5/2014 | Buzzard | B62D 1/184 |
| | | | | 74/493 |
| 2014/0277896 | A1 * | 9/2014 | Lathrop | B62D 1/04 |
| | | | | 701/23 |
| 2016/0200344 | A1 * | 7/2016 | Sugioka | B62D 1/183 |
| | | | | 74/493 |
| 2016/0244070 | A1 * | 8/2016 | Bendewald | B60W 50/08 |
| 2016/0375926 | A1 * | 12/2016 | Lubischer | B62D 1/183 |
| | | | | 74/493 |
| 2016/0375927 | A1 * | 12/2016 | Schulz | B62D 1/183 |
| | | | | 280/775 |
| 2016/0375931 | A1 * | 12/2016 | Lubischer | B62D 1/183 |
| | | | | 701/23 |
| 2017/0341677 | A1 * | 11/2017 | Buzzard | B62D 1/183 |
| 2017/0369091 | A1 * | 12/2017 | Nash | B62D 1/181 |
| 2018/0148084 | A1 * | 5/2018 | Nash | F16C 3/03 |
| 2018/0370559 | A1 * | 12/2018 | Swamidason | B62D 1/185 |

* cited by examiner

MANUALLY ADJUSTABLE STEERING COLUMN ASSEMBLY

BACKGROUND

The following description relates to steering column assemblies and, more particularly, to a manually adjustable steering column assembly for autonomous or semi-autonomous vehicles.

Adjustable steering column assemblies are limited to a range of motion that keeps the steering wheel within proximity of the driver's reach. However, advancements in autonomous or semi-autonomous driving systems may eliminate this limitation in some cases. If a steering wheel is retracted away from a driver to a retracted (e.g., stowed) position, it may be desirable to maintain the column in the retracted position, while allowing for a driver to quickly and easily reposition the steering wheel to an extended position.

SUMMARY OF THE INVENTION

According to one aspect of the disclosure, a steering column assembly includes a first jacket. Also included is a second jacket operatively coupled to the first jacket, the first jacket manually telescopingly moveable relative to the second jacket between an extended position and a retracted position. Further included is a clamp lever moveable between an unlocked position and a locked position, the first jacket manually moveable from the retracted position to the extended position when the clamp lever is in the unlocked position.

According to another aspect of the disclosure, a steering column assembly includes a first jacket having a first portion with a first diameter and a second portion with a second diameter that is greater than the first diameter. Also included is a second jacket operatively coupled to the first jacket, the first jacket manually telescopingly moveable relative to the second jacket between an extended position and a retracted position, the first portion of the first jacket engaged with an inner surface of the second jacket in the extended position, the second portion engaged with the inner surface of the second jacket in the retracted position to provide a clamp force in the retracted position.

According to yet another aspect of the disclosure, a steering column assembly includes a first jacket. Also included is a second jacket operatively coupled to the first jacket, the first jacket manually telescopingly moveable relative to the second jacket between an extended position and a retracted position. Further included is a clamp lever moveable between an unlocked position, a locked position and a partially locked position, the locked position fixing the first jacket relative to the second jacket, the unlocked position allowing telescoping movement of the first jacket, the clamp lever biased to the partially locked position when the first jacket is in the retracted position, the first jacket manually moveable from the retracted position to the extended position when the clamp lever is in the partially locked position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, a steering column assembly with manual stowing capability is disclosed. The embodiments described herein may be employed with various types of steering columns. In particular, electric power steering systems and autonomous or semi-autonomous driving systems are examples of vehicle steering columns that may benefit from the embodiments disclosed herein. The term autonomous or semi-autonomous refers to vehicles or vehicle sub-systems that are configured to perform operations without continuous input from a driver (e.g., steering, accelerating, braking etc.) and may be equipped with Advanced Driver Assist Steering (ADAS) system(s) to allow the vehicle to be autonomously controlled using sensing, steering, and/or braking technology.

Figure 1:
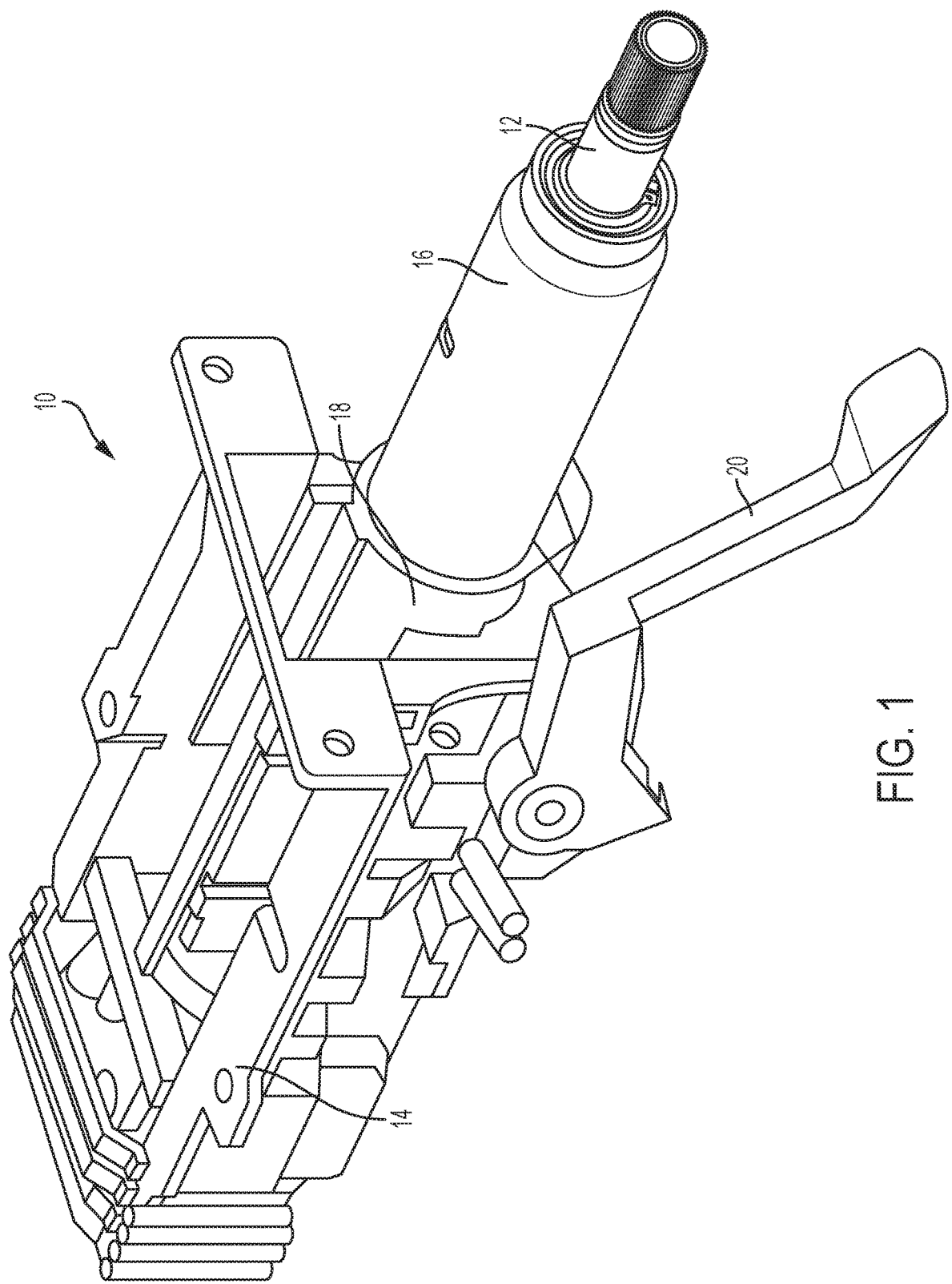
FIG. 1 is a perspective view of a steering column assembly.

Referring to FIG. 1, the steering column assembly 10 is illustrated. The steering column assembly includes steering shaft 12 that is coupleable with a steering input device, such as a steering wheel (not shown). The steering shaft 12 may be coupled to one or more other steering shafts. The steering column assembly 10 also includes stationary support structures 14 that are directly or indirectly secured to any suitable mounting structure of the vehicle.

The steering shaft 12 is disposed within a first jacket 16, which may be referred to as an upper jacket. The upper jacket 16 is in telescoping connection with a second jacket 18, which may be referred to as a lower jacket. The telescoping arrangement of the jackets 16, 18 allows the column assembly, and therefore, the steering wheel, to be translated to provide adjustment capability of the steering wheel relative to a seated driver. Typically, the steering column assembly 10 is adjustable over a first range of movement that is limited to a range of positions that allow a driver to comfortably reach and handle the steering wheel for manual steering of the vehicle in a manual driving mode. This first retraction limit is a typical telescope retraction limit provided by steering column assemblies. However, the steering column assembly 10 disclosed herein may be utilized in an autonomous or semi-autonomous vehicle, as described above. In such embodiments, the steering column assembly 10 may be retracted away from the driver and toward or into the instrument panel of the vehicle to a range of positions that are out of the typical range of manual steering positions. This additional range of movement is referred to as a second range of movement of the steering column assembly 10.

The first range of movement, or positions, define an extended position of the steering column assembly 10 and the second range of movement, or positions, define a retracted (or stowed) position. The extended position is employed when the vehicle is in a manual steering, or driving, mode and the retracted position is available when the vehicle is in the autonomous or semi-autonomous driving mode. The retracted position provides more room for a driver, thereby providing enhanced comfort or functionality.

As shown in FIG. 1, the steering column assembly also includes a clamp lever 20 that is operatively coupled to the first and second jackets 16, 18. The clamp lever 20 is moveable (e.g., rotatable) between a locked position and an unlocked position. In the locked position, the clamp lever 20 actuates a clamping force on the jackets 16, 18 that fix the axial (i.e., translatable) position of the first jacket 16, such that it will not translate relative to the second jacket 18. In the unlocked position, the driver may manually adjust the axial position of the first jacket 16 relative to the second jacket 18. Adjustment may be made to the retracted position in the unlocked position of the clamp lever 20.

Figure 3:
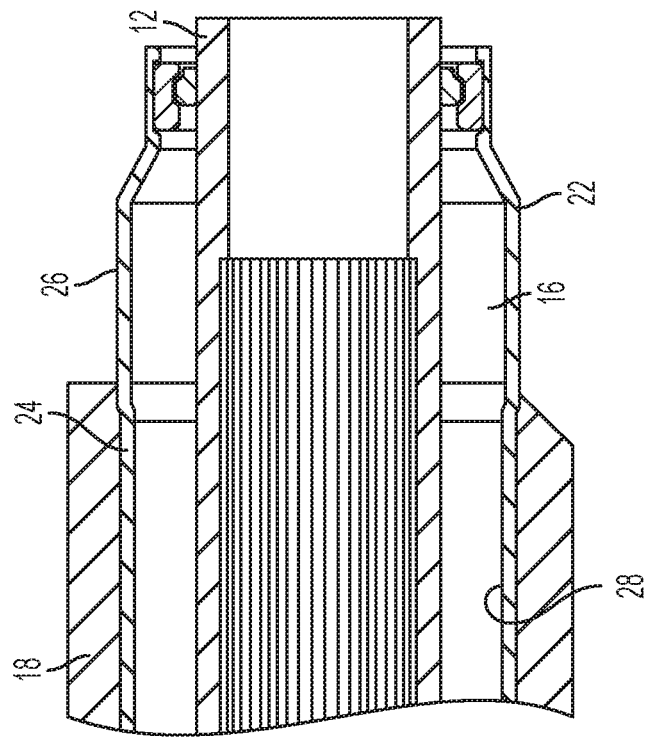
FIG. 3 is a cross-sectional view of the steering column assembly in a second position.
Figure 2:
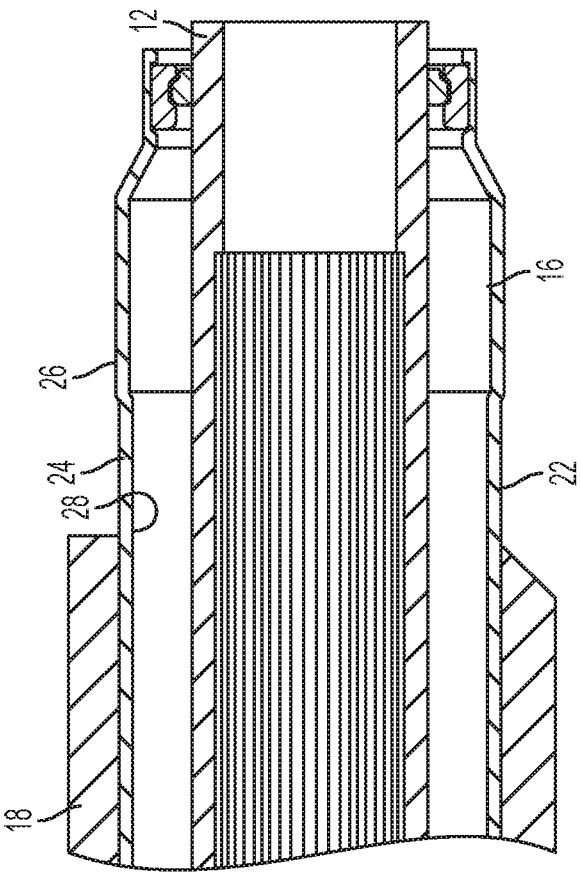
FIG. 2 is a cross-sectional view of the steering column assembly in a first position.

Referring now to FIGS. 2 and 3, a portion of the steering column assembly 10 is illustrated in two different positions. The first jacket 16 is extended, relative to the second jacket 18. in FIG. 2 when compared to the position of the first jacket 16 shown in FIG. 3. When the steering column assembly 10 is in the retracted position, it is desirable to maintain the assembly in the position manually selected by the user. Therefore, some form of clamping or other retention force may be employed to fix the first jacket 16, relative to the second jacket 18. Moving the clamp lever 20 to the locked position after adjustment is the typical manner in which this is achieved. However, in the retracted position, as defined herein, it may be desired to quickly and easily allow a user to adjust the steering column assembly to the extended position without first manipulating the clamp lever 20 to the unlocked position. The embodiments described herein provide such ability and position retention.

In the illustrated embodiment, the first jacket 16 includes an outer surface 22 that defines an overall perimeter. In some embodiments, such as the illustrated embodiment, the first jacket 16 has a circular cross-section and the perimeter may be referred to as a diameter. As shown, the first jacket 16 includes a first portion 24 that has a first perimeter and a second portion 26 that has a second perimeter. At least a portion of the second perimeter is greater than the first perimeter. In other words, the second portion 26 of the first jacket 16 extends further out radially when compared to the first portion 24 of the first jacket 16. The greater perimeter, or diameter, may be only a circumferential portion of the second portion or the entire perimeter, or diameter, may be greater.

The outer surface 22 of the first jacket 16 is positioned in close proximity to, or in contact with, an inner surface 28 of the second jacket 18. When the first portion 24 of the first jacket 16 is axially aligned with the inner surface 28 of the second jacket 18, the outer surface 22 of the first jacket 16 is in close proximity with, or in light contact with, the inner surface 28, such that translation is easily achieved. However, when the second portion 26 of the first jacket 16 is aligned with the inner surface 28, the greater perimeter (or diameter) engages the inner surface 28 to an extent that exerts a light clamping force on the first jacket 16. This retention force is sufficient to maintain the position of the first jacket 16 when it is not subjected to significant forces of a magnitude associated with a driver pulling on the steering column assembly 10. Therefore, the clamp lever 20 is not required to be repositioned to the locked position. However, the retention force is low enough to allow the driver to manually pull on the steering column assembly (via the steering wheel) to translate the first jacket 16 to the extended position if manual driving is desired or required.

In other embodiments, the retention force is provided with other components, while still allowing a driver to move the steering column assembly 10 to the extended position when the clamp lever 20 is not in the locked position, as with the embodiment described above. In an embodiment, the clamp lever 20 is biased with a spring, or other biasing component or assembly, to a partially locked position that is between the locked position and the unlocked position. This intermediate position provide a light clamp force that is less than that provided at the fully locked position, while being low enough to allow the driver to manually pull on the steering column assembly (via the steering wheel) to translate the first jacket 16 to the extended position if manual driving is desired or required. In yet another embodiment, one or more detents are included to provide the advantages described above. The detent(s) may be included on the outer surface 22 of the first jacket 16 and/or on the inner surface 28 of the second jacket 18.

The embodiments described herein provide a light clamp condition while leaving the clamp lever 20 in a position that is unlocked or not fully locked. This allows the driver to directly unstow the steering column assembly 10 without a separate motion to unlock the steering column assembly 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
a first jacket;
a second jacket operatively coupled to the first jacket, the first jacket manually telescopingly moveable relative to the second jacket between an extended position and a retracted position; and
a clamp lever moveable between an unlocked position and a locked position, the first jacket manually moveable from the retracted position to the extended position when the clamp lever is in the unlocked position, wherein the first jacket includes a first portion with a first perimeter and a second portion with a second perimeter that is greater than the first perimeter, the first portion of the first jacket engaged with an inner surface of the second jacket in the extended position, the second portion engaged with the inner surface of the second jacket in the retracted position to provide a clamp force in the retracted position.

2. The steering column assembly of claim 1, wherein a portion of the second perimeter is expanded relative to the first perimeter.

3. The steering column assembly of claim 1, wherein the entire second perimeter is expanded relative to the first perimeter.

4. The steering column assembly of claim 1, wherein the steering column assembly is part of an autonomous driving assist steering (ADAS) system.

5. The steering column assembly of claim 4, wherein the first jacket is retractable over a first range of movement, the extended position being within the first range of movement, the first jacket further retractable over a second range of movement that further from a driver, the retracted position being within the second range of movement.

6. A steering column assembly in an autonomous or semi-autonomous vehicle comprising:
 a first jacket having a first portion with a first diameter and a second portion with a second diameter that is greater than the first diameter; and
 a second jacket operatively coupled to the first jacket, the first jacket manually telescopingly moveable relative to the second jacket between an extended position and a retracted position, the first portion of the first jacket engaged with an inner surface of the second jacket in the extended position, the second portion engaged with the inner surface of the second jacket in the retracted position to provide a clamp force in the retracted position.

7. The steering column assembly of claim 6, wherein a portion of the second diameter is expanded relative to the first diameter.

8. The steering column assembly of claim 6, wherein the entire second diameter is expanded relative to the first diameter.

9. The steering column assembly of claim 6, wherein the first jacket is retractable over a first range of movement, the extended position being within the first range of movement, the first jacket further retractable over a second range of movement that further from a driver, the retracted position being within the second range of movement.

\* \* \* \* \*